2 Sheets—Sheet 1.
H. S. MAXIM,
Assignor, by mesne assignments, to F. A. LYMAN and H. F. TAYLOR.
APPARATUS FOR GENERATING GAS FOR HEAD LIGHTS.
No. 10,101. Reissued May 2, 1882.
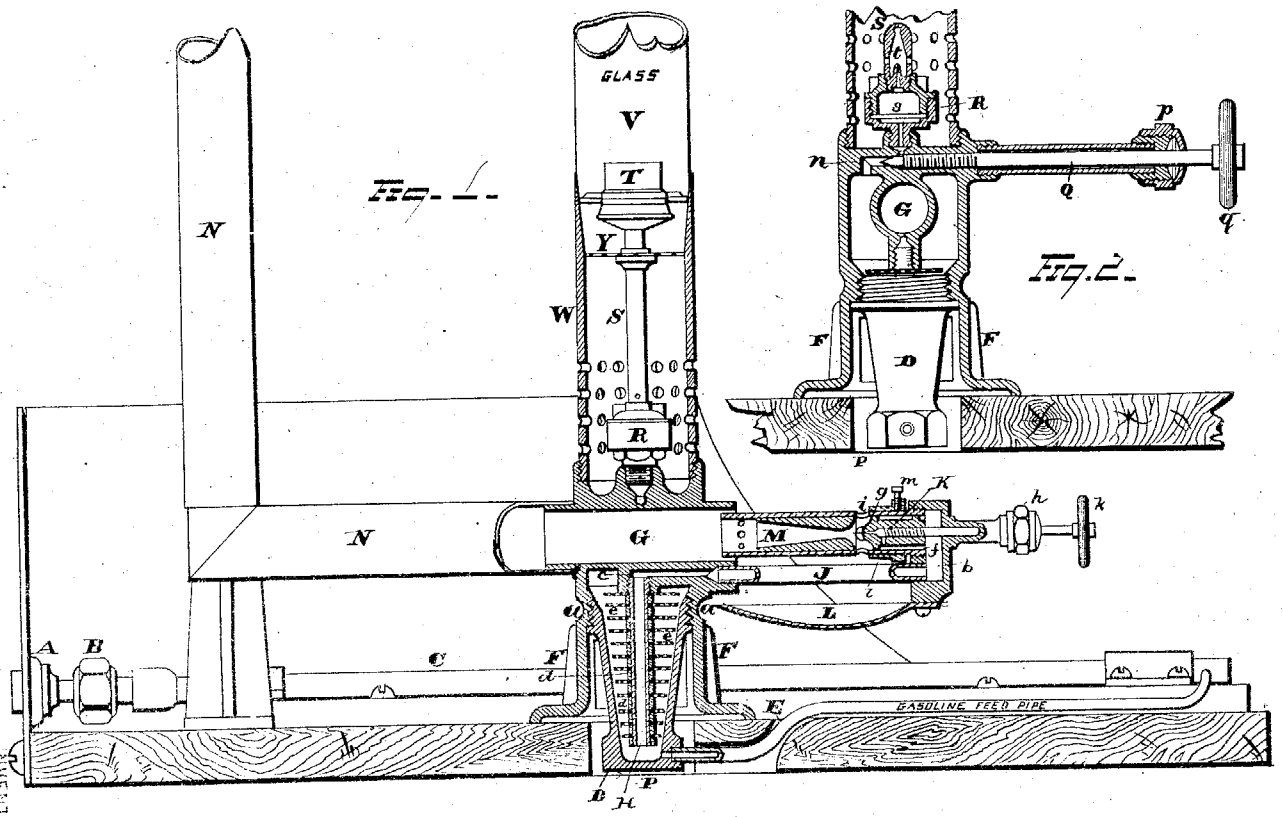
WITNESSES
E. J. Nottingham
A. M. Bright
Hiram S. Maxim.
By Sugrue & Sugrue
ATTORNEYS.

2 Sheets—Sheet 2.
H. S. MAXIM,
Assignor, by mesne assignments, to F. A. LYMAN and H. F. TAYLOR.
APPARATUS FOR GENERATING GAS FOR HEAD LIGHTS.
No. 10,101. Reissued May 2, 1882.
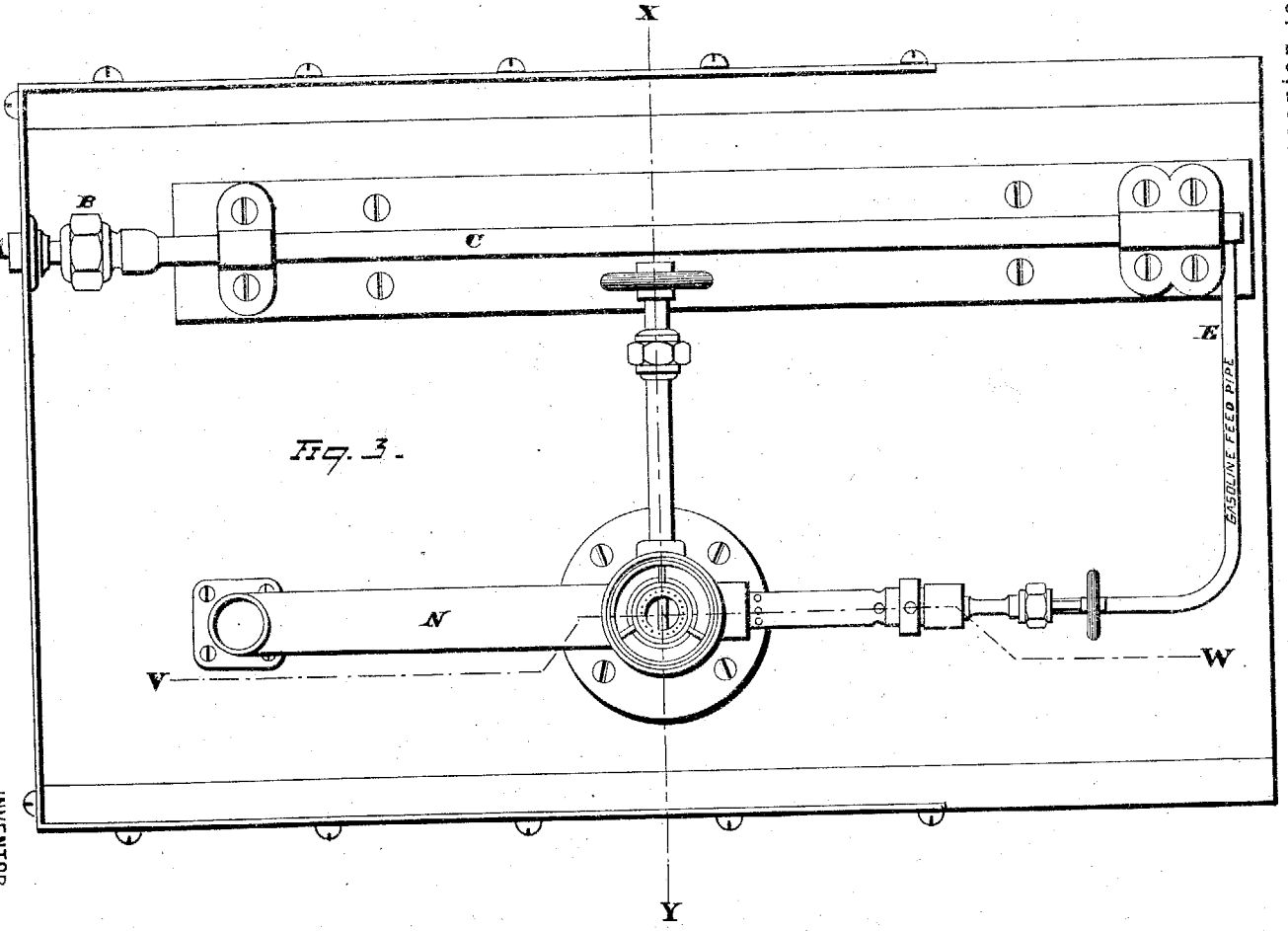
WITNESSES
E. J. Nottingham
A. M. Bright
INVENTOR
Hiram S. Maxim.
By Sugrue & Sugrue
ATTORNEYS.

UNITED STATES PATENT OFFICE.

HIRAM S. MAXIM, OF NEW YORK, N. Y., ASSIGNOR, BY MESNE ASSIGNMENTS, TO F. A. LYMAN AND H. F. TAYLOR, OF CLEVELAND, OHIO.

APPARATUS FOR GENERATING GAS FOR HEAD-LIGHTS.

SPECIFICATION forming part of Reissued Letters Patent No. 10,101, dated May 2, 1882.

Original No. 99,927, dated February 15, 1870. Application for reissue filed September 2, 1879.

*To all whom it may concern:*

Be it known that I, HIRAM S. MAXIM, of the city, county, and State of New York, have invented a new and useful Improvement in Gas Head-Lights for Locomotive-Engines; and I do hereby declare that the following is a full and exact description thereof, reference being had to the accompanying drawings, making part of this specification, and to the figures and letters marked thereon, and in which—

Figure 1 is a vertical section of the apparatus through the line V W in Fig. 3; Fig. 2, a vertical section through the line X Y in Fig. 3; Fig. 3, a top view or plan of the apparatus. The same parts are indicated by the same letters of reference in all the figures.

My invention relates to an improvement in the mode of generating gas from hydrocarbon fluids by the heat of an auxiliary flame, and in separating and using for that purpose the heavy or refuse portion of the fluid. In this apparatus the hydrocarbon fluid is contained in a tank or reservoir, which may have an elevated position within or upon the head-light case, so that the fluid may run down to the generating-chamber by its own gravity; or it may be placed in any convenient location and be forced into the generating-chamber by the action of compressed air within the tank, or otherwise; but in all cases the tank communicates with the generator by means of a pipe, which connects the lower part of the one with the lower part of the other; and when the tank is secured to the head-light case I make this pipe with a telescopic joint, as shown in Figs. 1 and 3, in which the pipe A, connecting with the tank, passes centrally through the stuffing-box B and within the pipe C, which is attached to the apparatus and connects with the generator D by the pipe E, thus permitting the gas apparatus to be drawn forward or outward sufficiently for all the necessary purposes of manipulation or adjustment without disturbing the tank.

The generator D is a conically-shaped vessel, and is placed in the apparatus with the small end downward within the base or pedestal F, to which it is screwed by its upper or larger part, as shown at *a a*, Fig. 1, and immediately below the heating-chamber G.

Attached to the heating or flame chamber G, and within the generator D, is a pendent tube, H, connecting with the lateral tube J by means of the small additional generator *c*, for a purpose to be presently explained.

Within the generator D, and around the pendent tube H, there are a number of parallel disks of fine wire-gauze or perforated sheet metal, *e e*, which are held at a proper distance apart by means of tubular thimbles *d* around the pendent tube H, as shown in Fig. 1. The lowest thimble of the series, being screwed to the end of the tube, secures all the disks in position. The object of these disks is to prevent the agitation or disturbance of the fluid within the generator by the motion of the locomotive. The lighter portion of the hydrocarbon fluid or gasoline (which is the most valuable for illuminating purposes) ascends through the meshes or perforations of these disks to the upper part of the generator, while the heavier and comparatively worthless portion passes up from the bottom of the generator through the pendent tube H, small generator *c*, and lateral tube J, to the back chamber, *b*, and then, by the small passages *f*, through the contracted vent *g*, which is controlled and closed, when required, by the conical screw-valve K, passing through the stuffing-box *h* and screw-tapped through a support near the jet-orifice, so that any contraction of the parts in cooling when the valve is closed may act only upon that part of the rod between the jet-orifice and the support, while the remainder of the rod may adjust itself by sliding through the stuffing-box, and is rotated by the small hand-wheel *k*, the said conical valve having a central needle-like projection, which passes through the central vent, *g*, when the valve is closed, and which is withdrawn, or partially so, on opening the valve, thereby keeping the vent *g* at all times free from obstructions and in working order.

Immediately below the pipe J is a small spoon-shaped disk, L, for the purpose of holding alcohol, or a little of the gasoline may be allowed to run into it by opening the screw-valve K, and upon this being ignited, so as to start the apparatus, the tube J will become hot, and thereby vaporize the fluid within it, and the vapor thus generated passes up to the small back chamber, *b*, and by the small passages *f*, through the contracted vent *g*, into the burning-tube M, the atmospheric air being drawn into the tube through the perforations *i* by the high velocity of the gas jet in passing through it, thus forming a small sub gas apparatus, and the gas produced by it, being ignited, projects a strong flame into the heating-chamber G, atmospheric air being also drawn in to support the combustion of the gas through the annular space between the heating-chamber and the burning-tube M by means of the draft of the chimney N.

The admission of atmospheric air to the burning-tube *i* is regulated by the adjusting-piece *l*, which is secured in the desired position by the set-screw *m*, by means of which adjusting-piece the perforations may be reduced in area to any required degree.

The heat of the flame in the chamber G passes by conduction to all the parts of the apparatus in contact with it, and in this way the upper portions of the generator D and pendent tube H are made hot, while the lower portions of the generator are kept cool by exposing it to a draft of open air, the bottom of the head-light case being cut away sufficiently to permit the air to act upon it, as shown at P, Fig. 1, and the base or pedestal F is made with large ventilating-openings for the same purpose. The vapor formed in the upper part of the generator D passes up through the passage *n*, which is controlled by the screw-valve Q, passing through the stuffing-box *p*, and rotated by the small hand-wheel *q*. This is, like valve-rod K, supported near the point by being screw-tapped through a support adjacent to the point, as shown. From the passage *n* the vapor passes up into the chamber R beneath the screen *s*, which is made of fine wire-gauze and perforated sheet metal placed together; or either may be used separately, if preferred, the object being to prevent the passage of any feculent matter to the contracted vent *t* that may have come up with the vapor from the fluid in the generator, and which, without such screen or its equivalent, is liable to close or impair the action of the vent. The vapor passing through the contracted vent *t* at a high velocity draws sufficient atmospheric air into the mixing-tube S through the small holes at its base to make, with the vapor, an illuminating-gas of great power, using for that purpose an Argand burner, T, inclosed by a glass chimney, V, mounted upon the air-tube W, which is attached to the heating-chamber G, and inclosing the chamber R and mixing-tube S, and has numerous small holes at its base for the admission of air as well for the mixing-tube S, to be carbureted by the vapor, as to support the combustion of the gas at the burner T.

Beneath the burner T in the air-tube W, I place a disk of perforated metal, Y, through which the air passes to the burner T, the object being to prevent the flame from the burner passing downward within the air-tube W in the event of vapor escaping by the air-vents at the base of the mixing-tube S.

The air-tube W being attached directly to the heating-chamber G, its lower end becomes very hot, and thereby heats the air in its passage through the small holes provided for that purpose at its base. The heated air combining with the gas from the burner, enables it to be ignited at the top of the glass chimney, which is a matter of very great importance, as it obviates the necessity of removing the glass chimney from the lamp preparatory to lighting it, as must be done when cold air only is used to support combustion, because cold air condenses this kind of gas. The valve K of the sub gas apparatus by its hand-wheel *k* controls and extinguishes, when required, the flame of the burning-tube M in the heating-chamber G, and the valve Q by its hand-wheel *q* controls and extinguishes, when required, the illuminating-flame at the burner T, and the two valves conjointly regulate the flow of the fluid from the tank to the generator D.

The apparatus which I have herein described has been found to work well in practice, and is of cheap and durable construction, and not liable to get out of order, and is particularly designed to be attached to those head-light cases and reflectors which have been constructed for burning oil or petroleum. The arrangement and construction of the apparatus, however, may be changed or modified in various ways without thereby changing the principle or character of the invention, and although specially intended for locomotive head-lights, it may be applied to and used for any purpose where a cheap and brilliant light is desirable.

What I claim is—

1. In a vapor-burner, the combination of a generator provided with a horizontal tube leading thereto, a jet-orifice controlled by a needle valve and so placed with reference to the tube as to discharge vapor into the tube, and a pipe for the passage of gasoline to the jet-orifice, the latter provided with a drip-cup, whereby initial heat can be applied to the gasoline-pipe by igniting the contents of the drip-cup, substantially as set forth.

2. In a vapor-burner, a needle-valve operated by a screw-shaft threaded at or near its point, the screw-shaft suspended within a hollow tube, said tube provided with a stuffing-box at its outer extremity, substantially as and for the purposes shown.

3. The combination of the tank with the generating apparatus by means of a telescopic pipe, in the manner and for the purposes substantially as described.

4. The combination of the horizontal disks of wire-gauze or perforated sheet metal with the generator to prevent the disturbance or agitation of the fluid within it by the motion of the locomotive, substantially as described.

5. The combination of the small generator *e* with the burning-tube M and its contracted vent, and air-induction vents for vaporizing and burning the heavy oil from the bottom of the generator, in the manner substantially as described.

6. The combination of the sub-vaporizing apparatus with the heating-chamber, in the manner and for the purpose substantially as described.

7. The combination, with the chimney N, of the heating-chamber G for the purpose of drawing in the heating-flame from the burning-tube M, substantially as described.

8. The combination of the tank with the generating apparatus by means of a telescopic pipe, in the manner and for the purpose substantially as described.

9. In a vapor-burner, devices, substantially as described, for heating the generator at top and cooling it at bottom, in the manner and for the purpose specified.

10. The combination, with the generator, of the pendent tube H for removing the heavy oil from the gasoline fluid, in the manner and for the purpose set forth.

11. The combination, with the generator, of the devices, substantially as described, for separating the heavy or refuse portion of the gasoline fluid from the lighter and best portions of it, and vaporizing and burning the same to produce the heat for converting the lighter portion into an illuminating-gas, in the manner and for the purpose described.

12. The combination, with the air-tube W, perforated as described, of the burner T and wire-gauze disk Y, located below the burner, as and for the purpose described.

In testimony whereof I have hereunto set my hand in the presence of two witnesses.

HIRAM S. MAXIM

Witnesses:
WM. M. RICHARDSON,
C. D. MILLER.